US005390587A

United States Patent [19]

Wu

[11] Patent Number: 5,390,587

[45] Date of Patent: Feb. 21, 1995

[54] MEDICINAL HERB INFUSION DISPENSER

[76] Inventor: Hsien-Jung Wu, No. 36, Sec. 1, Jong Shan Rd, Yeong Her, Taipei, Taiwan, Prov. of China

[21] Appl. No.: 161,539

[22] Filed: Dec. 6, 1993

[51] Int. Cl.[6] ................................ A47J 31/34

[52] U.S. Cl. ................................ 99/279; 99/295; 99/321; 210/449; 210/463

[58] Field of Search ................ 99/295, 279, 298, 300, 99/316, 317, 321, 323; 4/222, 225.1, 605; 426/77, 422, 423; 210/449, 463; 604/82, 83, 84, 85

[56] References Cited

U.S. PATENT DOCUMENTS 1,208,806 12/1916 Loyer ................................ 210/449
2,926,594 3/1960 Werner ................................ 99/295
3,199,437 8/1965 Nelsen ................................ 99/295
3,822,018 7/1974 Krongos ................................ 210/449
3,854,389 12/1974 Hillemann ................................ 99/295
5,274,858 1/1994 Berry ................................ 4/605

*Primary Examiner*—Robert W. Jenkins
*Attorney, Agent, or Firm*—Bacon & Thomas

[57] ABSTRACT

Herbs contained within a filter assembly disposed within an outer enclosure assembly is infused by hot water from a faucet when a connector tube at the top of the enclosure assembly is attached to the faucet outlet and an outlet at the bottom of the enclosure assembly is opened, thereby permitting the herb infused liquid to be dispensed for a medicinal bath.

4 Claims, 2 Drawing Sheets

MEDICINAL HERB INFUSION DISPENSER

SUMMARY OF THE INVENTION

As standards of living increase, the healthful effects of bathing, specifically the physically invigorating aspects of hygienic cleanliness, has led to the direct utilization of medicinal herbs chiefly in the form of herbal infusions. The aforesaid herbal infusion refers to the placing of medicinal herb ingredients into the bath water to improve the physical health of the human body. All herbal formulas arc not the same and different ingredients are utilized for specific symptoms. The mineral bath is perhaps the more commonly observed form of medicinal bath, but there has been a recent interest in herbal baths, of which the invention herein offers an excellent preferred embodiment which shall be described in full detail.

At present, the tea bath is mainly utilized in tea production regions since there is an abundant supply of tea to provide a strong infusion. However, this approach is not convenient or economical. In view of this, the inventor herein has conceived the idea of adopting the principles of a medicinal tea bag to provide a practical alternative that can be utilized in the home, and this is among the major objectives of the invention herein.

To enable a thorough understanding of the aforementioned structural and technological aspects of the invention herein, the following brief description of the drawings and detailed description of the invention here are provided.

DETAILED DESCRIPTION OF THE INVENTION

Figure 4:
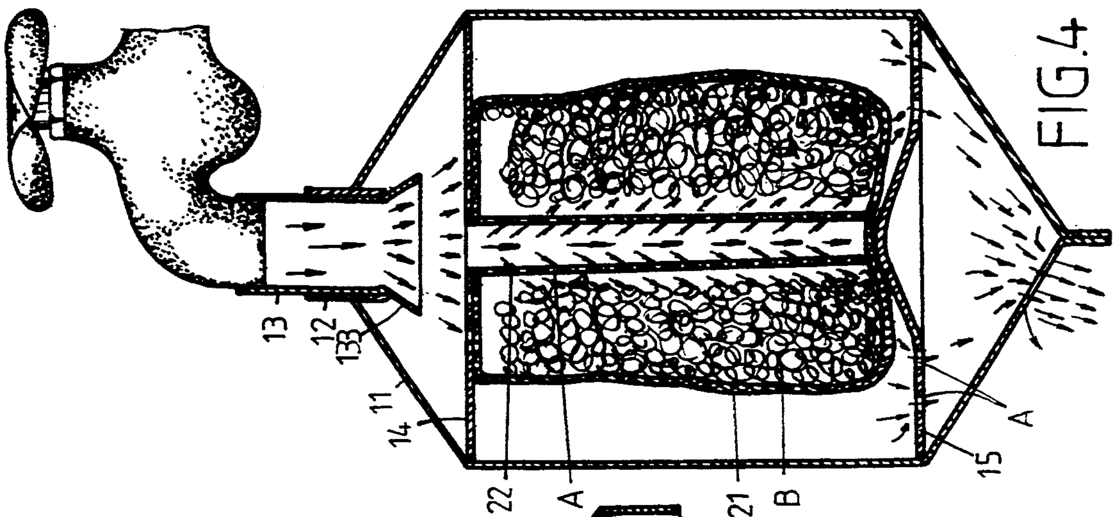
FIG. 4 is cross-sectional view of the invention illustrating the internal water flow.
Figure 3:
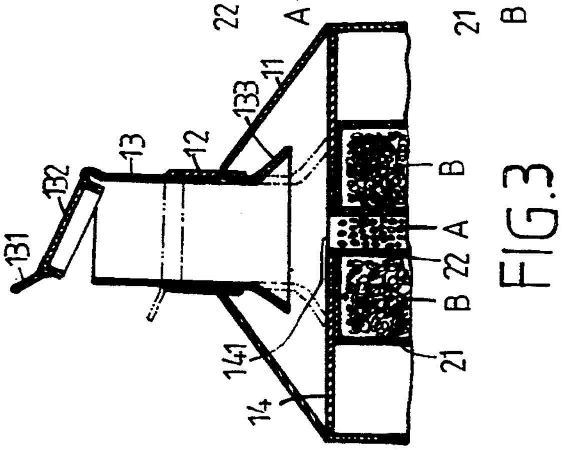
FIG. 3 is a partial cross-sectional view showing of the faucet connector of the invention.
Figure 1:
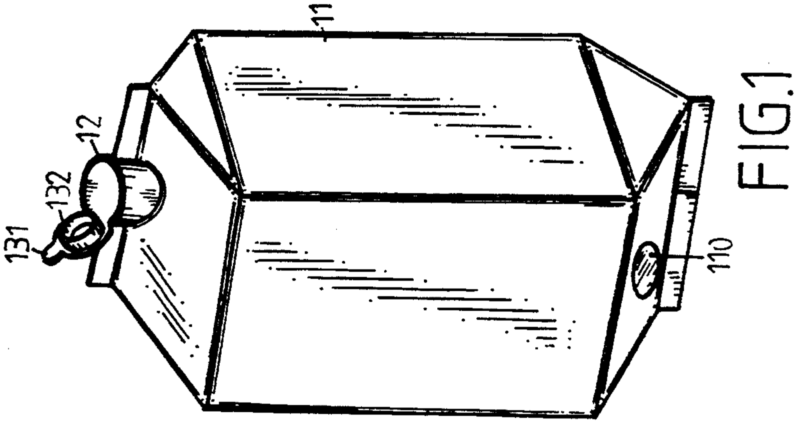
FIG. 1 is a perspective view of the invention herein.
Figure 2:
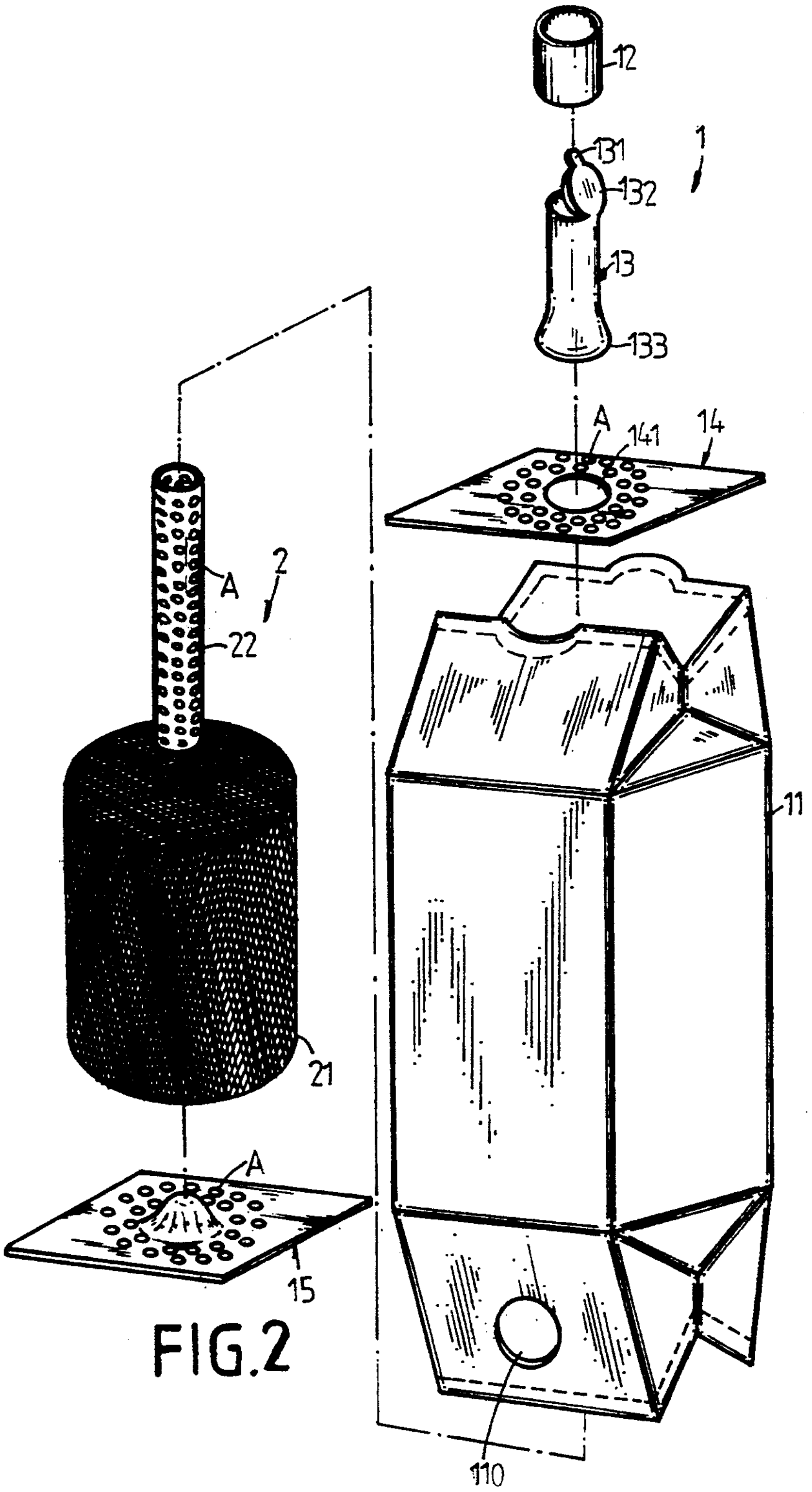
FIG. 2 is an exploded perspective view of the invention herein.

The invention herein is a kind of new structure medicinal herb infusion dispenser that mainly consists of an outer enclosure assembly (1) including an outer enclosure (11) with an herb container (21) inside and a filter assembly (2) that is placed into the outer enclosure (11) between a perforated upper separator plate (14), including a water input opening (141), and a perforated lower separator plate (15). A faucet connector tube (13) is inserted through the concentrator tube (12), and the concentrator tube (12) is positioned into the top of the outer enclosure (11) and, when installed into the sealed opening of the outer enclosure (11), the concentrator tube (12) is secured in position at the top of the outer enclosure (11). After insertion through the sealed opening at the bottom of the outer enclosure (11), the lower opening (110) and cap (131) are fixed with an aluminum foil seal to prevent the herbs (B) from spilling out, and this details the entire assembly procedure of the invention herein.

The invention herein is a kind of new structure medicinal herb infusion dispenser that consists of the aforementioned structure and assembled according to the aforementioned procedure. During utilization, it is only necessary to tug the pull ring (131) on the cap (132) and lift out the faucet connector tube (13), until its flared bottom end opening (133) engages the bottom end of concentrator tube (12), thereby limiting its outward extension tube 13 is then connected to the faucet and, the lower opening (110) is cleared so that when the water faucet is turned on, hot water flows through the faucet connector tube (13) mounted in the upper separator plate (14) and the lower separator plate (15) inside the outer enclosure (11), and the water flowing pass the upper separator plate (14) is then distributed through the perforations in the core or flow-through tube (22) into the herbs (tea leaves) (B) and, as the hot water swirls through the herbs (tea leaves) (B), the water becomes an infusion of bath water as it empties out of the outer enclosure (11) via the lower opening (110) below the lower separator plate (15) to provide a running supply of herbally infused bath water.

As described in the aforementioned section, The invention herein is a kind of new structure medicinal herb infusion dispenser that consists of herbs (tea leaves) (B) contained inside the outer enclosure (11) that treats the rapidly flowing water running through the invention herein to become an infusion of medicinal herbs, thereby offering extreme convenience and this is among the major design objectives of the invention herein.

What is claimed is:

1. A medicinal herb infusion dispenser comprising:

a) an outer enclosure including an upper inlet and a lower outlet;

b) a filter assembly for containing a medicinal herb, the filter assembly being disposed within the outer enclosure for infusion by a liquid entering the outer enclosure through the upper inlet and leaving the outer enclosure through the lower outlet;

c) the upper inlet including a concentrator tube and a faucet connector tube slidably received with the concentrator tube for outward extension with respect to the concentrator tube; and d) the faucet connector tube including an open top end for attachment to the outlet end of a faucet and receiving liquid therefrom and an open bottom end, closure means for closing the open top end and means for limiting the outward extension of the faucet connector tube with respect to the concentrator tube.

2. The dispenser of claim 1 wherein the filter assembly further includes:

a) an upper perforated separator plate and a lower perforated separator plate;

b) means for containing the medicinal herb, the containing means being positioned between the upper and lower separator plates;

c) a perforated core tube extending through the containing means; and d) wherein when liquid from the faucet is received within the outer enclosure through the upper inlet, the liquid flows through the upper separator plate and core tube to infuse the medicinal herb within the containing means and the infusion liquid is thereafter directed outwardly of the outer enclosure through the lower outlet.

3. The dispenser of claim 1 wherein the lower outlet further includes a removable seal closure.

4. The dispenser of claim 1 wherein the means for limiting the outward extension of the faucet connector tube includes the open bottom end of the faucet connector tube being flared for engagement against a bottom end of the concentrator.

* * * * *